Feb. 13, 1923.

J. M. STUCHLIK.
CALIPERS.
FILED OCT. 4, 1920.

1,445,050.

INVENTOR
John M. Stuchlik
BY Frank J. Schraeder Jr
Attorney.

Patented Feb. 13, 1923.

1,445,050

UNITED STATES PATENT OFFICE.

JOHN M. STUCHLIK, OF ROUNDUP, MONTANA, ASSIGNOR OF ONE-HALF TO FERDINAND KOJIS AND ONE-HALF TO VINCENT BUDJAC, BOTH OF MILWAUKEE, WISCONSIN.

CALIPERS.

Application filed October 4, 1920. Serial No. 414,631.

*To all whom it may concern:*

Be it known that I, JOHN M. STUCHLIK, a citizen of the Republic of Czecho-Slovakia, residing at Roundup, in the county of Musselshell and State of Montana, have invented a new and useful Improvement in Calipers, of which the following is a specification.

This invention relates to improvements in calipers.

An object of the invention is to provide, in combination with an inside or outside caliper of any unknown or preferred construction, a mechanism for selectively limiting the adjustment of the caliper, and for maintaining the caliper in adjusted position.

It is also an object of the invention to attach this adjustable stop to the caliper so that the stop may be folded to a position approximately parallel with one of the legs of the caliper, permitting thereby the caliper to be stored in a compact space.

It is also an object of the invention to provide a caliper combined with a selectively adjustable stop, which can be moved from operative to inoperative position, and vice-versa, without any difficulties.

With these and other objects in view, an embodiment of the invention is illustrated in the accompanying drawing and is described in the following specification.

The caliper comprises the legs 1 and 2, shown in the embodiment, as constructed particularly for inside measurements, although the invention can also be applied to an instrument mainly intended for outside measurements. These two legs are pivotally interconnected at their top by means of a suitable pin 3. A spring 4, seated at its ends in suitable notches of the legs, has the tendency to move the caliper legs apart and means are provided for adjustably limiting this movement.

Figure 1:
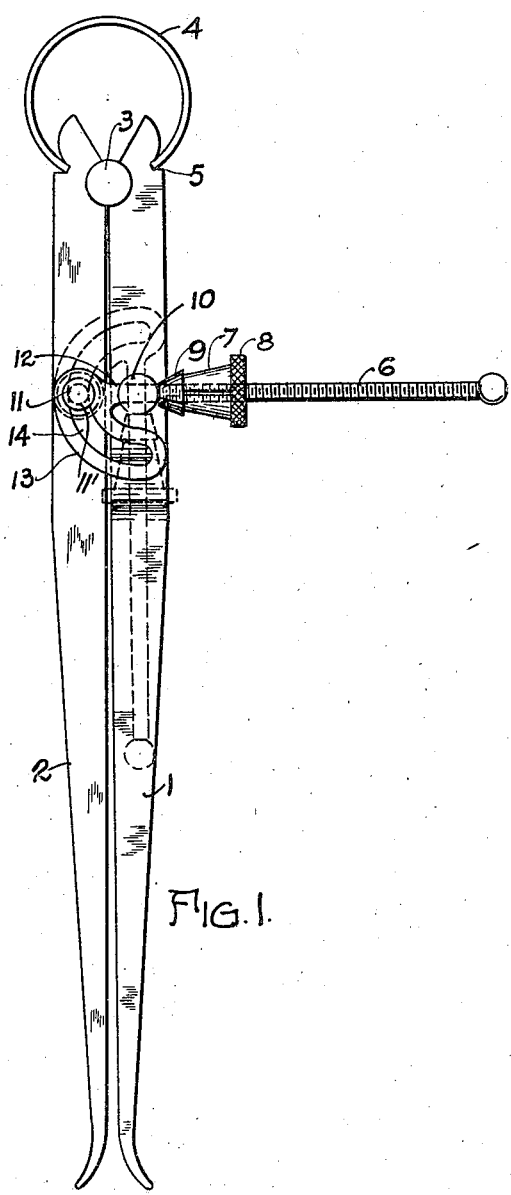
Fig. 1 is a side elevation of the improved caliper.
Figure 2:
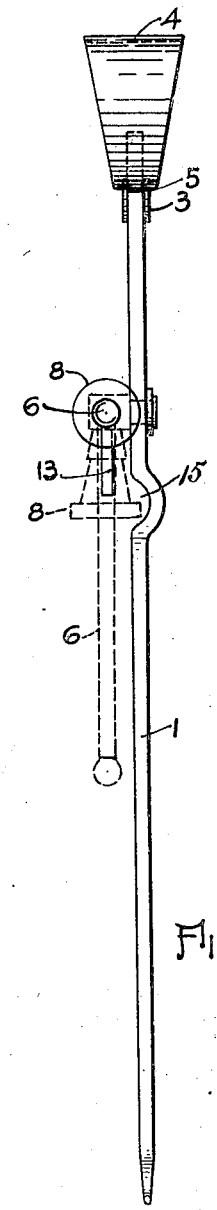
Fig. 2 is an end elevation of the same.

In the improved embodiment illustrated in the drawing, a screw spindle 6 is pivotally and slidably mounted in the pin 10 on the leg 1 and carries a slotted nut 7, which is tapering from a knurled portion 8, towards a thimble 9, said thimble being adapted for engagement with the pivot pin 10, extending from the leg 1 upwardly. A headed pin 11 is fixed to the leg 2 of the caliper, and an extension 12 of the spindle terminates in an arcuate head 13, which is provided with a slot 14, concentric to the pivot 10 and adapted to embrace a reduced portion 11′ of the head or the pin 11. The length and curvature of this slot, which is concentric to the axis of the pivot 10, is just sufficient to permit projection of the spindle 6 at right angle to the longitudinal axis of the leg 1 when the spindle is in one terminal position, while upon swinging movement of the head 13 to the other terminal position, indicated in dotted lines in Fig. 1, the spindle 6 is approximately parallel to the longitudinal axis of the leg 1 with the nut extending into the recess 15.

From the above it is apparent that in the operative position of the adjusting device, the spindle will project at right angle and will permit the adjustment of the nut 7, thereby limiting through its impact on the pivot 10 the extent to which the caliper may be opened. This adjustment also will maintain the legs in a predetermined relation to each other. If, however, the caliper is to be placed into the tool box, the adjusting spindle will be turned about the pivot 10 from the position indicated in full lines, to the position indicated in dotted lines, thereby assuring that the legs are maintained in closed position and that the entire device may be put away in limited space within a tool box.

I claim:

1. A caliper, comprising two legs pivotally connected together at one end, means for yieldingly holding the legs in open position, an eyed pin pivotally connected to one of the legs, a rod slidably extending through the eye of the eyed pin and having a head provided with a slot concentric with the eyed pin when the legs are in closed position, another pin extending through the concentric slot and into the other leg, and means on said rod for adjustably limiting the distance apart of said legs.

2. A caliper, comprising two legs pivotally connected together at one end, a spring for yieldingly holding the legs in open position, an eyed pin pivotally mounted medially on one of the legs, a screw spindle extending slidably through the eye of the eyed pin and having a head on its inner end provided with a slot concentric with the eyed pin when the two legs are in closed position, another pin extending through the concentric slot and into the other leg, the slotted head extending on one side of the spindle to permit the spindle to be swung to a closed position approximately parallel to the legs when in folded position, and a nut threaded on the spindle for adjustably limiting the distance apart of the legs.

3. A caliper, comprising two legs pivotally connected together at one end, one of said legs having an outwardly curved portion to form a side recess, a spring for yieldingly holding the legs in open position, an eyed pin pivotally mounted medially on one of the legs, a screw spindle extending slidably through the eye of the eyed pin and having a head on its inner end provided with a slot concentric with the eyed pin when the two legs are in closed position, another pin extending through the concentric slot and into the other leg, the slotted head extending on one side of the spindle to permit the spindle to be swung to a closed position approximately parallel to the legs when in folded position, and a nut threaded on the spindle for adjustably limiting the distance apart of the legs, said nut entering the side recess when the spindle is swung to a position parallel to the legs.

In witness whereof, I have hereunto subscribed my name this second day of September, 1920.

JOHN M. STUCHLIK.